United States Patent [19]

Davis

[11] 4,200,705

[45] Apr. 29, 1980

[54] PROCESS FOR PREPARING BLENDS OF VINYL ESTERS AND REACTIVE DILUENTS

[75] Inventor: Rhetta Q. Davis, Lake Jackson, Tex.

[73] Assignee: The Dow Chemical Company, Midland, Mich.

[21] Appl. No.: 225

[22] Filed: Jan. 2, 1979

Related U.S. Application Data

[63] Continuation-in-part of Ser. No. 897,886, Apr. 19, 1978, abandoned, which is a continuation-in-part of Ser. No. 768,308, Feb. 14, 1977, abandoned.

[51] Int. Cl.$^2$ .................... C08L 63/02; C08L 61/10
[52] U.S. Cl. ........................... 525/482; 204/159.16; 260/18 PF; 525/488; 525/502; 525/524; 525/530; 525/531; 528/105; 528/112
[58] Field of Search ................. 260/833, 836, 837 R, 260/18 PF, 2 BP, 832, 875; 528/105, 112

[56] References Cited

U.S. PATENT DOCUMENTS

| | | | |
|---|---|---|---|
| 3,179,623 | 4/1965 | Bowen | 260/47 |
| 3,256,226 | 6/1966 | Fekete et al. | 260/23.5 |
| 3,301,743 | 1/1967 | Fekete et al. | 161/194 |
| 3,317,465 | 5/1967 | Doyle et al. | 260/47 |
| 3,367,992 | 2/1968 | Bearden | 260/837 |
| 3,377,406 | 4/1968 | Newey et al. | 260/837 |
| 3,867,354 | 2/1975 | Betts et al. | 260/78.4 EP |
| 3,933,935 | 1/1976 | Zachariades | 260/836 |

*Primary Examiner*—Theodore E. Pertilla

[57] ABSTRACT

A curable vinyl ester composition is prepared by the process wherein an organic hydroxy compound is reacted with a stoichiometric excess of an ethylenically unsaturated carboxylic acid and, after substantial completion of that esterification, reacting an oxirane compound with the unesterified carboxyl groups.

10 Claims, No Drawings

PROCESS FOR PREPARING BLENDS OF VINYL ESTERS AND REACTIVE DILUENTS

REFERENCE TO COPENDING APPLICATION

This application is a continuation-in-part of my copending application having U.S. Ser. No. 897,886 filed Apr. 19, 1978 now abandoned, which was a continuation-in-part of U.S. Ser. No. 768,308 filed Feb. 14, 1977 and now abandoned.

BACKGROUND OF THE INVENTION

Terminally unsaturated vinyl ester resins are the reaction product of a polyepoxide and about equivalent amounts of an ethylenically unsaturated monocarboxylic acid. Such resins possess a number of outstanding properties which account for their commercial acceptance in such areas as molding resins, corrosion resistant reinforced plastic pipe and other vessels, glass fiber laminates and the like. The resins are generally too viscous to be handled easily in most fabrication methods. As a result, it is commonplace to lower the viscosity of the composition by blending the vinyl ester resin with an ethylenically unsaturated diluent such as the esters of acrylic or methacrylic acid.

The separate preparation of the diluent requires isolation of the product and purification as by distillation. Also it is frequently necessary to preheat the viscous vinyl ester resin to be able to blend the diluent uniformly therein.

THE PRIOR ART

Vinyl ester resins and conditions and methods for making them are described in U.S. Pat. Nos. 3,179,623; 3,301,743; 3,317,465; 3,377,406; 3,256,226 and 3,367,992.

SUMMARY OF THE INVENTION

The objects and benefits of the invention, whereby the previously described problems are overcome, are achieved by the sequential process wherein an organic hydroxy compound is esterified with a stoichiometric excess of an $\alpha,\beta$-ethylenically unsaturated carboxylic acid to form a reaction mixture of the so formed ester and unreacted carboxylic acid and thereafter introducing into said reaction mixture an amount of an oxirane compound equivalent to the unesterified carboxyl groups and causing reaction to form a second ester. By the process both the vinyl ester resin and the reactive diluent can be made in the same vessel without requiring extraneous solvents or separate isolation and purification steps. In addition, the reactive diluent and vinyl ester resin are uniformly mixed without the need for preheating the resin or the imposition of prolonged stirring.

DETAILED DESCRIPTION OF THE INVENTION

The present invention is an improved process for preparing a uniform blend of an unsaturated ester diluent and a vinyl ester resin where the carboxylic acid in each ester is the same. Essentially, the process is a stepwise procedure wherein the reactive diluent ester is made first and that reaction mixture of ester and unreacted acid becomes the solvent for making the vinyl ester resin.

The organic hydroxy compound is a monohydroxy or polyhydroxy compound. The compound should be free of other groups that are reactive with carboxyls or oxirane groups. Among the useful compounds are the alkanols, the alkyl glycol ethers and the polyoxyalkylenes and substituted polyoxyalkylenes. Typical of the preferred alkyl glycol ethers are those having the formula:

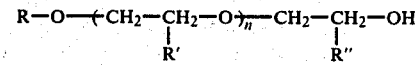

wherein R is aryl or an alkyl group having from about 1 to about 8 carbon atoms; R' and R" are individually hydrogen, methyl or ethyl and n is 0 or 1. Included in the useful compounds within the formula are the phenyl ether or ethylene glycol; the butyl ether of diethylene glycol; the methyl ether of butylene glyocl; the isobutyl ether of propylene glycol. Also included as a monohydroxy compound is dicyclopentadiene alcohol.

Representative of the polyhydroxy organic compounds is the novolac of phenol and formaldehyde preferably extended with two or more moles of an alkylene oxide, such as ethylene oxide. Yet another polyhydroxy organic compound is a bisphenol such as bisphenol A that has been extended with an alkylene oxide, preferably with from about 1 to 8 moles of ethylene oxide per mole of the bisphenol.

The epoxide may be a monoepoxide or a polyepoxide. Useful polyepoxides include polyglycidyl ethers of polyhydric phenols or polyhydric alcohols, epoxy novolac resins, epoxidized diolefins or fatty acids or drying oils containing more than one oxirane group per molecule. The polyepoxides also include those wherein the molecular weight has been increased by reaction with a difunctional compound such as a dicarboxylic acid or a diphenolic, such as bisphenol A. Typical of such dicarboxylic acids are maleic acid; a 36 carbon dimer acid and carboxyl terminated elastomers, such as Hycar CTBN.

Preferred polyepoxides are the polyglycidyl ethers of polyhydric phenols and polyhydric alcohols, the epoxy novolac resins and mixtures thereof wherein the epoxide equivalent weight may vary from about 150 up to about 2000 or even higher.

The useful monoepoxides are those containing one oxirane group per molecule and include the alkylene oxides as well as glycidyl ethers such as phenyl glycidyl ether or butyl glycidyl ether.

The unsaturated acid may be either monocarboxylic or polycarboxylic. The acid should be of relatively low molecular weight to be a liquid at least at the reaction temperature and preferably at room temperature. Because the acid forms the terminal portions of the vinyl ester it should be terminally unsaturated and polymerizable by free radical catalysis. Preferred acids are acrylic acid and methacrylic acid.

The process is a two-step esterification reaction wherein the reactive diluent is prepared first, followed by the preparation of the vinyl ester with the reactive diluent as the solvent. The invention results in at least a 35 percent reduction in time for the overall process for synthesis of the diluent and vinyl ester and approximately a 50 to 60 percent reduction in time for preparation of the diluent since that ester is not distilled prior to the second esterification. Also the process minimizes the materials handling and transfer operation and utilizes a minimum of equipment.

In the first step the organic hydroxy compound and the acid are mixed together with an esterification catalyst and preferably a small amount of a polymerization inhibitor, such as hydroquinone or the methyl ether of hydroquinone. The amount of acid employed is the total amount to be employed in the overall process. Advantageously, on an equivalent basis, the amount of acid will be in the proportion of 1.5 to about a 10-fold excess based on the equivalents of organic hydroxy compound employed. Proportions of acid below those indicated amounts will frequently result in incomplete conversion to the desired ester. Optimum proportions are easily determined by simple preliminary experiments. When using the preferred reactants of acrylic acid and a monoalkyl glycol ether, the optimum proportion is about 5 equivalents acid to one equivalent ether. The proportions to be used will depend also on the ratio of reactive diluent to vinyl ester desired in the final product. The above-indicated proportions will provide a final product containing about 5 to 45 percent diluent.

The reactants are uniformly mixed and heated to a temperature advantageously in the range of from about 85 to 120° C., preferably from 95 to 100° C. The reaction is continued until the esterification is substantially complete as indicated, for example, by the disappearance of carboxyl groups. With most reactants that substantial completion of the reaction will occur in 3 to about 6 hours although longer or shorter times may sometimes be required depending on the reactivity of the reactants, the efficiency and amount of catalyst and the temperature employed.

The product resulting from the first esterification is a solution of the reactive diluent and the excess acid. The product may be employed in the subsequent steps without purification or any other modification.

The second step of the process involves reaction of unreacted acid with an epoxide. The epoxide is added to the product of the first esterification in about stoichiometric amount to the unreacted acid together with a small amount of a catalyst, such as chromium acetate or chromium chloride, to promote the carboxyl/epoxide reaction. This blend of ingredients is heated, preferably stepwise, to a temperature of from about 85° C. to 120° C., preferably from 95° C. to 115° C., until reaction is substantially complete as indicated by the drop in acid value.

This process is useful for producing low viscosity vinyl unsaturated resins that can be cured by free radical polymerization. The products find utility in those applications for which vinyl esters are used. Thus, the products are curable by ultraviolet, electron beam or other ionizing radiation as coatings for a variety of substrate including wood, paper, metal or plastics. The products can also be employed in radiation curable ink formulations. The blends are also curable by thermal and catalytic inducement as with peroxides.

Although the resins produced hereby are low viscosity, for some applications, such as some printing inks, it may be desirable to have even further viscosity reduction. In such instances, additional reactive diluents may be incorporated into the product.

The process permits the preparation of a blend of a vinyl ester resin and a reactive ester diluent in a single reaction sequence without the necessity for isolating any intermediates. In the sequence the reactive ester diluent is made first and that diluent plus unreacted acid and the added epoxide form the solvent for the esterification of the acid and epoxide. It is a special benefit of the invention that the need for nonreactive or nonpolymerizable solvents for the esterification reaction is obviated. Thus, all of the materials in the final product are polymerizable or curable as such. By judicious choice of reactants and proportions a final product of almost any desired chemical and physical properties can be prepared.

EXAMPLE 1

Five equivalents of acrylic acid, one equivalent of the methyl ether of diethylene glycol, 0.3 weight percent hydroquinone and 1.0 weight percent of various catalysts were blended together in a three necked two liter flask equipped with a stirrer. The blend was stepwise heated to 95° C. and reacted until 1.0 equivalent carboxylic acid had disappeared (in 4 to 6 hours). Four equivalents of the diglycidyl ether of bisphenol A (epoxy equivalent weight of about 184) and 2.0 millimols chromium acetate dissolved in a small volume of methanol were added to the flask. The mixture was reacted at 100° to 110° C. to an acid value between 3 to 8. The product was cooled to 95° C. and 250 parts per million monoethyl ether of hydroquinone was added.

The results are shown in the following table.

TABLE I

| Sample | Catalyst | % COOH After Esterification | Equiv. Ratio Diluent/Epoxy | Resin Residual % COOH | % Epoxy | Visc. cps at 25° C. |
|---|---|---|---|---|---|---|
| 1 | p-TSA | 37.6 | 1.0/1.03 | 0.71 | 0.45 | 11,120 |
| 2 | Tyzor TE | 35.6 | 1.0/1.0 | 0.62 | 0.58 | 21,320 |
| 3 | MSC-1 | 33.8 | 1.0/1.0 | 0.5 | 0.5 | Low |
| 4 | TPP | 37.6 | 1.0/1.21 | 0.61 | 0.29 | 194,400 |
| 5 | DADBSn | 37.6 | 1.0/1.05 | 1.3 | 1.4 | 14,960 |
| 6 | DBSnO | 36.3 | 1.07/1 | 12.73 | 9.67 | Gelled |

P-TSA = paratoluenesulfonic acid
Tyzor TE = organic chelate of titanium
MSC-1 = macroporous cation exchange beads - H⁺ form
TPP = triphenylphosphite
DADBSn = diacetoxydibutyl tin
DBSnO = dibutyl tin oxide

EXAMPLE 2

(a) By the procedure of Example 1 a diluted resin was made from various ratios of the phenyl ether of ethylene glycol and acrylic acid and then reacted with the diglycidyl ether of bisphenol A (E.E.W. of about 184). The catalyst for the first esterification was 1.0 weight percent para-toluenesulfonic acid.

The results are shown in the following table.

TABLE II

| Sample | Step 1 Ratio Acrylic Acid/-Glycol Ether (equivalents) | % Conversion | Step 2 Ratio Epoxy/-Acrylic Acid (equivalents) | % Reactive Diluent | Residual % COOH | Residual % Epoxy | Visc. 25° C., cps | No. Passes | Rev Impact (in-lbs) | MEK Resistance (dbl rubs) |
|---|---|---|---|---|---|---|---|---|---|---|
| 7  | 10/1  | 81  | 1.0/1.0  | 6  | 0.31 | 1.1  | 132,000 | —   | —      | —   |
| 8  | 5/1   | 100 | 1.12/1.0 | 16 | 0.3  | 0.68 | 31,920  | 2   | >15    | >1  |
| 9  | 2/1   | 88  | 1.09/1.0 | 32 | 0.61 | 0.56 | 1,830   | 3   | >35-40 | >26 |
| 10 | 1.5/1 | 86  | 1.03/1.0 | 43 | 0.65 | 0.53 | 780     | 4-5 | >40-45 | >18 |

Number passes = the number of passes to cure to a tack free film at 100 feet per minute under one 200 watt per linear inch mercury vapor lamp. Photoinitiator was 2.5 percent benzophenone/2.5 percent N,N-dimethylaniline.

Sample No. 7 was too viscous to test as such. It was blended with 25 weight percent phenyl ether of ethylene glycol and, when tested, required 2 passes to cure, had a reverse impact greater than 5 inch-pounds and passed 100 double rubs in MEK resistance.

(b) For Comparative Runs A to D, mixtures of the distilled acrylate ester of the phenyl ether of ethylene glycol and the acrylate ester of the diglycidyl ether of bisphenol A having an epoxy equivalent weight of 184 were mixed in the same proportion as in Examples 2 to 5, respectively. The viscosity at 25° C. was measured. Comparative Sample A (in the ratios of Sample No. 7) had a viscosity of 280,000 cps; Sample B (in the ratios of Sample No. 8) had a viscosity of 33,880 cps; Sample C (in the ratios of Sample No. 9) had a viscosity of 3,216 cps and Sample D (in the ratios of Sample No. 10) had a viscosity of 840 cps.

EXAMPLE 3

A reaction charge was made from (1) one equivalent of a novolac resin extended with ethylene oxide, wherein the novolac is a phenol/formaldehyde resin having an average of 3.6 phenolic groups per molecule. The novolac is extended with an average of 4 ethylene oxide units per phenolic hydroxy; (2) 4 equivalents of acrylic acid; (3) 1.15 gram of hydroquinone and (4) 2.89 grams of para-toluenesulfonic acid. The charge was heated to 80° C. for about four hours then to 100° C. for about two hours and then cooled. The product analyzed to 23.58 percent carboxyl versus 23.4 percent theoretical.

In the second step of the process one acid equivalent of the above product was mixed with one equivalent of the diglycidyl ether of bisphenol A (E.E.W.=180–185) and 0.53 gram chromium acetate. The mix was heated to 110° C. gradually over a five hour period with 30 grams of additional diglycidyl ether added after two hours. The product contained 28.2 percent novolac acrylate and had a viscosity at 25° C. of 42,700 centipoises as measured with a Brookfield viscometer at 10 rpm.

EXAMPLE 4

One equivalent of dicyclopentadiene alcohol was mixed with 4 equivalents of acrylic acid, 0.88 gram of hydroquinone and 4.38 grams of para-toluene-sulfonic acid. The mixture was gradually heated to 100° C. and maintained there at for about four hours. The acid equivalent weight of the product was 146.48. The percentage of unreacted alcohol was 2.1 representing 93.9 conversion.

In the second step of the process one acid equivalent of the above-prepared diluent was mixed with one equivalent of the polyepoxide of Example 3, heated to 75° C. when 0.53 gram chromium triacetate and 4.9 grams of additional polyepoxide were added. The charge was heated gradually to 115° C. over about 2½ hours and an additional 4.9 grams polyepoxide added and reaction continued for one more hour. The product had 0.45 percent carboxyl and 0.58 percent epoxy. 0.18 Gram of the methyl ether of hydroquinone was added.

For Comparative Run E, a mixture was prepared of 37 weight percent of the acrylate ester of dicyclopentadiene alcohol and 63 weight percent of the diacrylate ester of the diglycidyl ether of bisphenol A having an epoxy equivalent weight of 184.

The final product from Example 4 and the mixture from Comparative Run E were each coated on a sheet of aluminum and baked at 400° F. (204° C.) for four minutes. After curing, the adhesion of each coating to the aluminum was determined by covering a 1 inch (2.54 cm) square surface divided into 100 equal squares with Scotch brand 610 tape and the pulling the tape away from the area and counting the squares remaining. In Example No. 4, 100 percent of the coating remained intact on the aluminum. In Comparative Run E, none of the coating remained intact on the aluminum.

EXAMPLE 5

A curable composition was prepared by first mixing together 247 grams (0.25 eq) of a glycerine initiated polyoxypropylene triol capped with ethylene oxide having a hydroxyl equivalent weight of 988, 64.5 grams (0.75 eq) methacrylic acid, 0.16 gram of hydroquinone and 3.12 grams of para-toluenesulfonic acid. The reaction mixture was heated to 110° C. for 12 hours, at which time 70 weight percent of the polyclycol had been converted to the methacrylate ester.

In the second step of the process, 33.5 grams (0.587 eq) of a diglycidyl ether of bisphenol A having an epoxy equivalent weight of 568, 1.3 gram of chromium acetate and 0.1 gram of hydroquinone were added to the reaction product from Step 1. The mixture was heated to 110° C. for 25 hours. At the conclusion of the reaction, 0.32 gram of the methyl ether of hydroquinone was added to the final product. The final product contained 1.13 weight percent COOH and 0.99 weight percent oxirane groups and had a viscosity at 25° C. of 1,120,000 cps.

The best mode known for carrying out the process of the invention is the following example.

EXAMPLE 6

A product was prepared from a total charge of 8674 grams. Into a reaction vessel was placed 38 weight percent of a reaction product of 1 mole bisphenol A with 4 moles of ethylene oxide (said reaction product containing 8.48 percent hydroxyl, 1.03 percent water and an equivalent weight of 200 grams) and 23.3 weight percent acrylic acid giving a ratio of acid to polyol of 1.6 to 1. To that charge was added 0.3 weight percent para-toluenesulfonic acid; 250 ppm hydroquinone and 250 ppm methyl ether of hydroquinone. The charge was heated to 115° C. and maintained thereat until the acid content reached about 13 percent. At that point, 66.3 percent of the acid had been esterified.

To the acid/ester blend was added 38.3 weight percent of the diglycidyl ether of bisphenol A (E.E.W.=184) and 0.5 millimoles per equivalent of that epoxide of chromium trichloride (33% in water). The charge was maintained at 115° C. until the residual epoxide was 0.67 percent and acid 0.68 percent. The residual water was 1 percent.

The product had a viscosity of 12,700 centistokes. The product was coated on steel and aluminum panels and exposed to ultraviolet radiation as in the previous examples with the following results:

| Panel | No. Passes | % Adhesion | MEK Dbl rubs | Hardness | Reverse Impact |
|---|---|---|---|---|---|
| Aluminum | 2 | 0* | 40 | 2H | — |
| Steel | 2 | 90–100 | 15 | 4H | 30–40 |

*90% adhesion after 2 minutes baking

Samples of the products were blended with 30 and 40 weight percent of the acrylate ester of the monophenyl ether of ethylene glycol (PhEA) coated on panels, exposed for 2 passes, and tested as above. The viscosity of the 30% blend was 867 centistokes and the 40% blend was 232 centistokes.

| Panel | % PhEA | % Adhesion | MEK Dbl rubs | Hardness | Reverse Impact |
|---|---|---|---|---|---|
| Aluminum | 30 | 5 | 2 | 4H | — |
| | 40 | 80–90 | 2 | 4H | — |
| Steel | 30 | 100 | 4 | 4H | 50 |
| | 40 | 100 | 4 | 4H | 40 |

EXAMPLE 7

Example 6 was repeated using 33.2 percent polyol; 23.4 percent acrylic acid (ratio=2/1) esterified to 75.3 percent of the acid and 43.1 percent of the diepoxide then reacted with the remaining acid. The viscosity of the product was 52,300 centistokes. When blended with PhEA, the viscosity of the 30% blend was 1152 centistokes and the 40% blend was 404 centistokes. The blends were coated on the panels, cured by exposure to radiation and tested giving similar results to those obtained in Example 6.

EXAMPLE 8

Example 7 was repeated using a reaction product of 1 mole bisphenol A and 6 moles ethylene oxide as the polyol. The charge was 40.7 percent polyol; 22.6 percent acrylic acid (ratio=2/1) esterfied to 80.7 percent after which 36.4 percent of the diepoxide was reacted with the remaining acid. The viscosity was 10,100 centistokes. When blended with PhEA, the viscosity of the 30% blend was 581 centistokes and the 40% blend was 251 centistokes. The blends were coated on panels, cured and tested giving similar results to those of Examples 6 and 7.

EXAMPLE 9

Example 6 was repeated using a blend of 0.25 equivalent of the diepoxide and 0.75 equivalent of a polyglycol diglycidyl ether (E.E.W.=175–205) as the diepoxide. The charge was 40.1 percent polyol and 22.6 percent acrylic acid (ratio 1.6/1) esterified to 77.4 percent and 37.1percent of the diepoxide reacted with the remaining acid. The viscosity was 4,200 centistokes. When blended with PhEA, the viscosity of the 30% blend was 358 centistokes and the 40% blend was 173 centistokes. The blends were coated on panels, cured and tested giving similar results to those of Examples 6–8.

What is claimed is:

1. In the process for preparing a curable composition of (1) a vinyl ester resin prepared from an $\alpha,\beta$-ethylenically unsaturated carboxylic acid and a compound containing at least one oxirane group and (2) as a reactive diluent, an ester prepared from the same unsaturated carboxylic acid and an organic hydroxy compound, the improvement being a sequential process wherein said organic hydroxy compound is reacted in a first esterification with an excess of equivalents of said carboxylic acid over that required to make said reactive diluent, and after substantial completion of the esterification, introducing into the reaction mixture of reactive diluent and unreacted carboxylic acid an amount of said oxirane compound in an amount equivalent to the unreacted acid from the first esterification, and causing substantially complete reaction of said oxirane compound and said carboxylic acid in a second esterification.

2. The process claimed in claim 1 wherein said organic hydroxy compound is a monohydroxy compound.

3. The process claimed in claim 2 wherein said monohydroxy compound is an ether of a glycol having the formula:

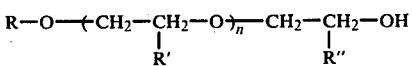

wherein R is alkyl or aryl; R' and R" are individually H or methyl and n is 0 or 1.

4. The process claimed in claim 3 wherein said ether is the phenyl ether of ethylene glycol.

5. The process claimed in claim 1 wherein said organic hydroxy compound is a polyol.

6. The process claimed in claim 5 wherein said polyol is a novolac of phenol and formaldehyde extended with about 4 moles ethylene oxide for each hydroxyl.

7. The process claimed in claim 1 wherein said unsaturated carboxylic acid is acrylic acid.

8. The process claimed in claim 1 wherein said oxirane compound is a polyepoxide.

9. The process claimed in claim 8 wherein said polyepoxide is the diglycidyl ether of bisphenol A.

10. The process claimed in claim 1 wherein from about 1.5 to about 10 equivalents of said unsaturated acid are initially reacted with each equivalent of organic hydroxy compound.

* * * * *